US00RE37711E

(19) United States
(12) Reissued Patent
Miller

(10) Patent Number: US RE37,711 E
(45) Date of Reissued Patent: May 21, 2002

(54) ENOL-ETHER CAPPED POLYETHERS AND SURFACTANTS PRODUCED THEREFROM

(75) Inventor: Glenn A. Miller, Charleston, WV (US)

(73) Assignee: CK Witco Corp., Middlebury, CT (US)

(21) Appl. No.: 09/370,124

(22) Filed: Aug. 2, 1999

Related U.S. Patent Documents

Reissue of:
(64) Patent No.: 5,773,484
Issued: Jun. 30, 1998
Appl. No.: 08/772,856
Filed: Dec. 20, 1996

U.S. Applications:
(60) Provisional application No. 60/009,082, filed on Dec. 22, 1995.

(51) Int. Cl.[7] ..... C08J 9/02
(52) U.S. Cl. ..... 521/174; 521/86; 521/110; 521/112; 521/170; 556/445
(58) Field of Search ..... 521/112, 86, 110, 521/170, 174; 556/445

(56) References Cited

U.S. PATENT DOCUMENTS 3,794,673 A 2/1974 Boersma et al.
3,907,851 A * 9/1975 Boersma et al. ..... 556/445
4,025,456 A 5/1977 Litteral et al.
4,147,847 A 4/1979 Schweiger
4,150,048 A * 4/1979 Schilling, Jr. et al. ..... 556/444
4,687,786 A 8/1987 Kollmeier et al.
4,814,403 A 3/1989 Dussart-Lermusiaux et al.
5,130,344 A 7/1992 Kollmeier et al.
5,145,879 A 9/1992 Budnik et al.
5,321,051 A 6/1994 Burkhart et al.
5,489,617 A 2/1996 Miller et al.
5,492,939 A * 2/1996 Stanga et al. ..... 521/112

OTHER PUBLICATIONS

Wu, et al., "Comb polysiloxanes with w–hydroxyoligo(oxyethylene) side chains", Polymer Bulletin 20, Springer–Verlag, (1988), pp. 455–461.

* cited by examiner

*Primary Examiner*—John M. Cooney, Jr.
(74) *Attorney, Agent, or Firm*—Nash and Titus, LLC

(57) ABSTRACT

The use of enol ether capped polyether-polysiloxane copolymers as surfactants in polyurethane foam applications is taught herein. These enol ether capped surfactants exhibit a high capping efficiency and yield good performance. Moreover, they are stable in water/amine premixes.

22 Claims, No Drawings

ENOL-ETHER CAPPED POLYETHERS AND SURFACTANTS PRODUCED THEREFROM

Matter enclosed in heavy brackets [ ] appears in the original patent but forms no part of this reissue specification; matter printed in italics indicates the additions made by reissue.

This application claims priority from U.S. Provisional Application Ser. No. 60/009,082, filed Dec. 22, 1995.

BACKGROUND OF THE INVENTION

In polyurethane foam manufacturing, surfactants are needed to stabilize the foam until the product-forming chemical reactions are sufficiently complete so that the foam supports itself and does not suffer objectionable collapse. High potency silicone surfactants, generally understood to be those which give a high height of rise and little top collapse at minimal use levels, are desirable because foams which collapse to a substantial degree before setting have high densities and objectionable density gradients. In general, it is preferred that the surfactant also gives high airflow performance. The latter feature refers to the ability of air to pass through the foam.

Silicone surfactants for polyurethane foam manufacture typically are materials having siloxane backbones and polyether pendant groups (hereinafter "Copolymers"), see for example, U.S. Pat. No. 4,147,847. The importance of the capping group on the ungrafted end of the polyether pendant is well known for many applications such as for flexible foam, see for example, U.S. Pat. No. 4,687,786. It has been taught that a large portion of the polyethers must be capped.

There are a variety of capping groups known such as acyloxy (e.g., acetoxy), alkyl (e.g., methyl), carbonate, or urethane groups. The first two are the most common and each has its own advantages and disadvantages. Acetoxy-capping is a simple convenient process although over 50% of the mass of acetic anhydride used is discarded as waste acetic acid. Essentially 100% capping can readily be achieved but the acetate cap is not hydrolytically stable to acidic or alkaline water. This is a serious deficiency with customers who operate by blending the surfactant into the water/amine premix prior to making foam.

Methyl-capping gives a capped hydroxyl group which is essentially infinitely stable to water/amine premix. Unfortunately, the Williamson Ether process has a number of problems. The capping efficiency is usually below 95% and typically is around 90–93%. This low capping efficiency generally results is not being able to produce as good airflow performance characteristics as observed with acetoxy-capped polyethers. In addition, the process involves handling toxic methylchloride gas as well as separating and disposing of large quantities of NaCl waste. With allyl-terminated polyethers, the harsh conditions used to generate the alkoxide can also rearrange the allyl group to a propenyl group, thus rendering a substantial portion of the polyether unreactive to the subsequent copolymer synthesis step.

Certain types of capping have also been used solely in an intermediary fashion to protect the polyether OH group during hydrosilation to prevent cross-linking (via dehydrocondensation and/or acetal coupling). See U.S. Pat. No. 3,794,673 which employs enol-ether capping. However, after the hydrosilation reaction is completed, the enol-ether group is hydrolyzed off in acidic conditions to generate the desired uncapped polyether copolymer free of cross-links. This same process was used later by E. Wu et al., "Comb polysiloxanes with ω-hydroxyoligo(oxyethylene) side chains", Polymer Bulletin, 20 (1988), 455–461, to produce uncapped Copolymers for use as electrolyte solvents. In none of the above cases was the enol-ether capped Copolymers used to make foam but rather were only intermediates en route to other structures.

SUMMARY OF THE INVENTION

The present invention provides the use of Copolymers that offer good potency which have the generalized average formula $M''D_xD''_yT_zM''$ wherein M"represents $(CH_3)_3SiO_{,1/2}$ or $R(CH_3)_2SiO_{1/2}$;

D represents $(CH_3)_2SiO_{2/2}$;

D"represents $(CH_3)(R)SiO_{2/2}$;

T represent $CH_3SiO_{3/2}$;

x is from about 20 to about 220;

y is from about 5 to about 34;

z is less than 4;

R is selected from the group consisting of alkyl, aryl and aralkyl groups of 1 to 18 carbons and polyether-containing substituents obtained from polyethers selected from the following two groups (1) and (2):

(1) $B—O(C_2H_4O)_{a'}(C_3H_6O)_{b'}R''$ polyethers having average molecular masses above 3000 daltons wherein B is an alkyl bridging group of $C_2$ to $C_4$;

a' and b' are independently 0 or positive numbers, provided that the total molecular weight of the polyether is above 3000 daltons;

R" represents —H, an alkyl group of 1–18 carbon atoms, —C(O)R'", —C(O)OR'" or —C(O)NHR'" or X;

X represents enol-ether capping moieties derived from $R'''_2C{=}CR'''—O—R'''$ or cyclic $—(CR'''_2)_r—Z_s—(CR_2)_{r'}—CR'''{+}CR''—O—$;

r is 1 to 5, s and r' are 0 through 1, and Z is O, S, or $SiR'''_2$;

R'" represents —H or a mono-functional alkyl, aralkyl or aryl group of up to 8 carbons; and (2) $B—O(C_2H_4O)_{a''}(C_3H_6O)_{b''}R''$ polyethers having average molecular masses in the range 300–3000 daltons wherein a" and b" independently 0 or positive numbers, provided that the total molecular weight of the polyether is between 300 and 3000 daltons;

and the B, R" and R'" moieties are as defined above;

with the provisos that (i) an average of at least one R group per silicone backbone must be a polyether from group (1) or group (2); (ii)there may be more than one polyether from either group; (iii) up to 20% of the propylene oxide ($C_3H_6O$) moieties may be replaced with higher alkylene oxide moieties; and (iv) at least one pendant polyether must be capped with an X moiety.

Another aspect of the present invention is polyurethane foam made by the process of the present invention.

DETAILED DESCRIPTION OF THE INVENTION

This invention relates to the use, in producing polyurethane foam, of enol-ether capped Copolymers having superior hydrolytic stability and high capping efficiency. For example, an enol-ether cap on a polyether survived alkoxylation (potassium metal and alkoxide @ up to 100° C. for 14 hours) and Williamson Ether synthesis (NaOMe/toluene azeotrope @ 120° C. for 5.5 hr. then heating with R—Cl at >90° C. for 2.5 hr.). This clearly demonstrates how strong the enol-ether cap is under alkaline conditions.

For flexible polyurethane foam applications, at least one polyether must be selected from Group (1) and there should be at least two different polyethers differing in molecular weight and/or ethylene oxide (EO)/propylene oxide (PO) ratio. The preferred sum of x+y should exceed 40 and the x/y ratio should preferably not exceed 20. For flexible foam, the blend average molecular weight (BAMW) of all the polyethers (not just those of group (1)) preferably should fall between 1000 and 3000 daltons and more preferably between 1100 and 2300 daltons.

For rigid polyurethane foam applications, one polyether is preferred and preferably selected from Group 2. The preferred sum of x+y should not exceed 80 and is preferably between 30 and 50.

It should be understood that within the groups of polyethers, each group can be composed of a single polyether or blends of polyethers the average of which is within the definition of its respective group. For example, two polyethers from Group (1) polyethers may be blended with one polyether from Group (2) and the three polyethers are then reacted with an appropriate SiH fluid (this would be termed a three polyether block Copolymer).

Both groups of polyether pendants may be composed of block or random distribution of EO and PO units within said polyether. Within the first Group there is a preferred subgroup of polyether pendants that is composed of between 30 and 60% by weight of EO residues and even more preferably approximately 40% by weight of EO residues. It is preferred that such polyethers have BAMW greater than 3500 daltons, more preferably above 4000 daltons.

A preferred subset of Group 2 polyethers contain <20 % by weight PO and have BAMW in the range 300–750 daltons.

It is possible to have different polyethers which have different capping groups. For example, in a two polyether Copolymer, the Group (1) polyether may be enol-ether capped while the Group (2) polyether is methyl-capped. These non-enol-ether capping groups within R" are preferably —C(O)$CH_3$, —$CH_3$, or -(t-butyl). Some suitable R'" moieties are methyl, ethyl, propyl, benzyl and phenyl.

Alkyl, aryl or aralkyl pendant groups may also be attached to the silicone backbone and are derived from the corresponding olefinic species. Examples include 1-octene, 2-methyl-allylchloride, allylcyanide, 2-methyl-i-pentene, substituted vinylbenzene, and norbornene derivatives.

Any enol ether can be employed in producing the Copolymers of this invention. Suitable enol ethers include the following: methyl vinyl ether, ethyl vinyl ether, n- or iso-butyl vinyl ether, iso-propyl vinyl ether, 2,3- or 2,5-dihydrofuran (the latter isomerizes to the former under reaction conditions), 2,3-dihydropyran, 2-methoxy-2,3-dihydropyran, 2-chloroethyl vinyl ether, ethyl 1-propenyl ether, ethyl isopropenyl ether, methyl isopropenyl ether, phenyl vinyl ether, phenyl isopropenyl ether, methyl cyclohexenyl ether, methyl cyclopentenyl ether, and ethyl cyclopentenyl ether.

It has been found that some of the compositions of this invention have relatively high viscosities and are preferably dissolved in a lower viscosity vehicle prior to use in polyurethane foam to yield good and reproducible results. It is preferred to dilute to Copolymer to about a viscosity of less than 2,000 centistokes at 25° C. Typical diluents include saturated, polar, high boiling point polyols or polyethers.

Method of Manufacture

Procedures for synthesizing nonhydrolyzable Copolymers are well known in the art, see for example U.S. Pat. Nos. 4,814,403 and 5,145,879 which are incorporated herein by reference. The manufacture of polyethers for said Copolymers is also well known in the art, see U.S. Pat. No. 4,025,456 (starting column, 7, line 13). The polyether manufacturing process produces polyethers as hydroxy end-capped species. The hydroxy groups may be enol ether capped prior to the hydrosilation reaction to form the Copolymers of the present invention or after the polyethers are grafted onto the polysiloxane backbone. It is preferred that the capping be done prior to hydrosilation to form the Copolymers of the present invention.

The capping reaction is

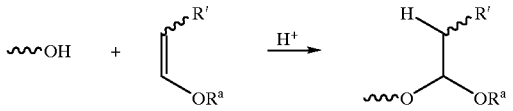

The reaction is quantitative, quick, mildly exothermic, generates no by-products, and has few side reactions. It can be done solventless. A stoichiometric equivalence of reactants is preferred, but it may be necessary to use slight (about 10%) molar excess of the enol to get a high percentage (>95%) of capping. The reaction may be run at 10° to 80° C. at atmospheric pressure. About 0.01 to 1 wt % of acid should be used, with about 0.2 wt % being preferred (this typically corresponds to between 0.1 to 20 equivalent % acid).

Concentrated sulfuric acid works well as an acid for the capping reaction. Supported catalysts such as A-18 Resin (an ion exchange resin available from Rhom & Haas) works well and simplifies the workup. p-Toluenesulfonic acid (PTSA) is not very soluble in mixed feed polyethers and gentle warming is required to get the reaction to proceed (temperatures above 50° C. cause the discoloration so care must be taken to keep the temperature at or below 45° C. despite any exotherm).

Extra care must be exercised when using enol-ethers such as ethylvinyl ether (EVE). At elevated temperatures, a side reaction occurs which effectively couples two polyethers together, which does not occur with enols like 2,3-dihydro-4H-pyran. Significant levels of coupled polyether are very undesirable since the Copolymer will become crosslinked, giving higher viscosities and possibly gelling. Fortunately, the coupling can be minimized by maintaining the reaction below 10° C.

Another problem with EVE is it has a tendency to homopolymerize in the absence of an alcohol, thereby generating highly colored materials. Although this precludes using high enol-ether excesses to drive the capping reaction, EVE appears to be very reactive toward the coupling reaction and low excesses give good capping.

Once the capping reaction is complete, it is important to maintain the pH of the resulting Copolymer substantially above pH 7 to avoid back reaction due to the presence of water. The acid catalyst can readily be neutralized with sodium carbonate, potassium carbonate, or tertiary amines such as trimethyl- or tributyl-amine. In the case of the carbonates, subsequent filtration is required. The use of an aqueous base is not preferred because some back reaction may occur with the water during neutralization. The supported acid catalysts are preferred because the product is simply decanted from the resin and then a small amount of amine buffer is added to maintain high pH.

Use

The Copolymers of the invention are employed in the manufacture of polyurethane foam in the manner known to the art which are generally made of (a) a polyether polyol containing an average of more than two hydroxyl groups per molecule; (b) an organic diisocyanate; (c) at least one catalyst; (d) optionally, an auxiliary blowing agent such as methylene chloride; (e) water; and (f) a Copolymer surfactant as defined hereinabove.

The polyols which can be utilized in the present invention include, but are not limited to, the following polyether polyols: (a) alkylene oxide adducts of polyhydroxyalkanes; (b) alkylene oxide adducts of non-reducing sugars and sugar derivatives; (c) alkylene oxide adducts of polyphenols; and (d) alkylene oxide adducts of polyamines and polyhydroxyamines. Alkylene oxides having two to four carbon atoms generally are employed, with propylene oxide, ethylene oxide and mixtures thereof being particularly preferred.

Any materials having active hydrogens, as determined by the Zerewitinoff method, may be utilized to some extent and therefore is included within the broad definition of the polyols. For example, amine-terminated polyether polyols, hydroxyl-terminated polybutadiene polyols and many others are known and may be used as a minor component in combination with the above-identified conventional polyether polyols.

Generally, the polyol component should have an equivalent weight in the range of about 400 to about 1500 grams/equivalent and an ethylene oxide content of less than 20%. Preferably the equivalent weight is in the range of about 500 to about 1300 grams/equivalent, and most preferably between about 750 and 1250 grams/equivalent. The polyol or polyol blend should have an average hydroxy functionality of at least 2. The equivalent weight is determined from the measured hydroxyl number. The hydroxyl number is defined as the number of milligrams of potassium hydroxide required for the complete hydrolysis of the fully acetylated derivative prepared from one gram of polyol. The relationship between the hydroxyl number and equivalent weight is defined by the equation: OH=56,100/equivalent weight, where OH equals the hydroxyl number of the polyol. Thus, polyols have hydroxyl numbers preferably in the range of about 43 to about 110, and more preferably in the range of about 45 to about 75.

Preferably the polyols should include the poly (oxypropylene) and poly(oxyethylene-oxypropylene) triols. Ethylene oxide, when used, can be incorporated in any fashion along the polymer chain. Stated another way, the ethylene oxide can be incorporated either in internal blocks, as terminal blocks, or may be randomly distributed along the polyol chain. However, the manner of incorporation and the ethylene oxide content of the polyol preferably is as noted above. Thus, ethylene oxide is used at a level below about 20% by weight, preferably below about 15% by weight, and is located primarily within the interior of the polyol chain. Thus, preferably the polyols are substantially secondary hydroxyls.

Preferably, a portion or all of the polyol component may be added in the form of a polyol polymer in which reactive monomers have been polymerized within a polyol to form a stable dispersion of the polymer solids within the polyol.

The amount of polyol used is determined by the amount of product to be produced. Such amounts may be readily determined by one skilled in the art.

Organic isocyanates useful in producing polyurethane foam in accordance with this invention are organic compounds that contain, on average, between about one and a half and about six isocyanate groups, and preferably about two isocyanate groups. Suitable organic polyisocyanates include the hydrocarbon diisocyanates, e., the alkylene diisocyanates and the aryl diisocyanates and more specifically, diphenylmethane diisocyanate and toluene diisocyanate ("TDI"). Preferred polyisocyanates are 2, 4 and 2, 6 toluene diisocyanates and their mixtures having a functionality of about 2, which are broadly referred to herein simply as TDI. The most preferred polyisocyanate is 80/20 TDI (i.e., a mixture of 80% 2,4-toluene diisocyanate and 20% 2,6-toluene diisocyanate).

The amount of isocyanate to be used is dependent upon the index of foam desired and the final properties of the foam to be formed. If the index is 100, then there is a stoichiometric, equivalent of the amount of isocyanate needed to react with the polyol component and the other active hydrogen containing components in the system. While the present invention may be practiced in a wide range of indexes, e.g. 60–120, the preferred range of use is indexes between 80 and 115; and most preferably the range of indexes is 85–95.

Water is preferably the sole blowing agent, to produce carbon dioxide by reaction with isocyanate. Water should be used at about 1 to 12 pphp (parts per hundred of polyol) and preferably between 2 and 10 pphp. At foam indexes below 100, the stoichiometric excess of water cools and blows via vaporization, not as part of the reaction to produce carbon dioxide. Other blowing agents may be used herein, in addition to or even instead of water, such as carbon dioxide, methylene chloride, halocarbons of 1–3 carbon atoms, and other equivalent inert blowing agents.

The catalyst component is one or a combination of standard tertiary amine and organometallic polyurethane catalysts which should be present at about 0.0001 to 5 weight percent of the reaction mixture. Suitable catalysts include, but are not limited to, dialkyltin salts of carboxylic acid, tin salts of organic acids, triethylene diamine (TEDA), bis (2,2'-dimethylaminoethyl) ether and similar compounds that are well known to the art.

The relative amounts of the various components of the foam formulation are not narrowly critical. The polyether polyol and polyisocyanate are present in a major amount and the relative amount of these two components is well known to the art. The blowing agent, catalyst, and surfactant are each present in a minor amount sufficient to foam the reaction mixture. The catalyst is present in a catalytic amount, i.e., that amount necessary to catalyze the reactions to produce the rigid, flexible, rim, molded microcellular and high resiliency polyurethane foam at a reasonable rate, and the surfactant is present in an effective amount sufficient to stabilize the foam and achieve the properties desired, typically about 0.1 to 8 parts per hundred parts polyol (pphp), preferably 0.3 to 3 pphp.

EXAMPLES

Example 1—Stability Study

To test the stability of a pyran cap, methyltriglycol (MTG) was capped with 2,3-Dihydro-4H-pyran using conditions described in U.S. Pat. No. 3,794,673 (Example 1). GC analysis indicates 97% capping was achieved. A sample of the resulting material (0.35g) was mixed with a conventional flexible foam formulation water/amine premix (1.15g of a 5.5:0.2 wt/wt water/A-200 amine mixture). Blends of acetoxy- and alkyl-capped MTG samples with conventional water/amine premix were similarly prepared (alkyl=$C_3H_5$ and MTG-Acetate (MTG-Ac) which were prepared via conventional means). The hydrolysis at a room temperature of the different capping groups was followed by GC. The results in Table 1 clearly show the acetoxy group cleaving rapidly to about 15–20% uncapped which is approximately the level at which the liberated acetic acid would neutralize all of the amine in the mixture. The pyran-capped material exhibits excellent stability, comparable to the alkyl-capped polyether.

TABLE 1

Stability of Capping Groups to Water/Amine Premix.

| | Acetoxy | | Pyran | | Alkyl | |
|---|---|---|---|---|---|---|
| Hours | % Capped | % Change | % Capped | % Change | % Capped | % Change |
| 0 | 94% | 0% | 96% | 0% | 88% | 0% |
| 14 | 83% | 12% | 96% | 0% | 88% | 0% |
| 37.5 | 78% | 17% | 94% | 2% | 82% | 7% |
| 60.5 | 81% | 13% | 96% | 0% | 88% | 0% |
| 85.8 | 81% | 14% | 96% | 0% | 88% | 0% |

The above experiment was repeated with more concentrated water/amine mixture. The various capped polyethers (~0.4g) were mixed with a 1:1 mixture of A-99 (a common flexible foam amine catalyst) and water (~1.1g). The samples were then heated at 62° C. and the hydrolysis monitored by GC. The results shown in Table 2 demonstrate the stability of the enol-ether cap (2,3-dihydro-4H-pyran) to be comparable to the alkyl cap, but the Acetoxy cap cleaved nearly quantitatively.

TABLE 2

Stability of Capping Groups to Conc. Water/Amine Premix (@ 62° C.)

| | Acetoxy | | Pyran | | Alkyl | |
|---|---|---|---|---|---|---|
| Hrs | % Capped | % Change | % Capped | % Change | % Capped | % Change |
| 0 | 99% | 0% | 97% | 0% | 88% | 0% |
| 11 | 88% | 9% | 97% | 0% | 88% | 0% |
| 31 | 63% | 34% | 97% | 0% | 88% | 0% |
| 125 | 11% | 88% | 97% | 0% | 88% | 0% |
| 147 | 8% | 92% | — | — | 88% | 0% |
| 315 | 1% | 99% | 97% | 0% | 88% | 0% |

Example 2—Capping Efficiency

Using a variety of acid catalysts, a broad spectrum of conventional polyethers of the type used for Copolymer synthesis were enol-ether capped. Excellent results were obtained even with random mixed feed polyethers such as 40 weight percent EO fluids that generally are approximately 95% 2° alcohols (due to the sluggish nature of PO reaction during the last stages of polyether manufacture). Thus Table 3 shows that the technology readily caps even high molecular weight, high 2° hydroxy polyethers very efficiently.

TABLE 3

Representative Capping Results.

| Polyether* | Enol-Ether (% Excess) | Acid Catalyst | % Capping |
|---|---|---|---|
| 100HA550 | 2,3-Dihydro-4H-pyran (50%) | PTSA | >98 |
| | Ethylvinyl Ether (14%) | A-18 Resin | >98 |

TABLE 3-continued

Representative Capping Results.

| Polyether* | Enol-Ether (% Excess) | Acid Catalyst | % Capping |
|---|---|---|---|
| 40HA1500 | 2,3-Dihydro-4H-pyran (50%) | PTSA | >98 |
| | Ethylvinyl Ether (14%) | A-18 Resin | –98 |
| | Ethylvinyl Ether (25%) | $H_2SO_4$ | >98 |
| 40HA4000 | 2,3-Dihydro-4H-pyran (50%) | PTSA | >98 |
| | Ethylvinyl Ether (25%) | $H_2SO_4$ | >98 |
| 75HA750 | 2,3-Dihydro-4H-pyran (50%) | PTSA | –98 |

*These are allylalcohol started polyethers, with the number "HA" meaning wt % EO and the number after "HA" indicating the molecular weight of the polyether. Capping efficiency determined via IR.

Example 3—Manufacture of Flexible Polyurethane Foam

In the examples that follow, all reactions involving the manipulation of organometallic compounds were performed in an inert atmosphere. Commercial reagents were used without additional purification.

The term potency refers to the ability of a surfactant to stabilize foam during its manufacture. High potency surfactants allow high heights of rise and only relatively small amounts of top collapse during foam manufacture. In general, higher rise and/or good rise at lower and lower use levels are desirable. The phrase "processing latitude" refers to the ability of a foam composition to tolerate changes in its ingredients or amounts thereof, while still producing product having the desired properties. In flexible foam applications, this is often reflected by relatively small changes in foam properties (such as breathability) at higher and higher surfactant or catalyst use levels. The terms breathability or airflow refer to the ability of a cured foam to permit passage of a gas. A "tight" foam has low breathability, while an "open" foam is said to have a high breathability and permits ready passage of gas through it.

Flat breathability refers to the property of a surfactant to function in foam compositions at low, customary, and high levels while still producing foams having relatively constant breathabilities. Low use levels are typically between 0.7 and 1.0 pphp. Customary levels are 1–3 pphp and high levels are greater than 3 pphp. In general, high and flat breathability performance are preferred.

The compounds designated as L-6900 (with uncapped polyethers), L-618 and L-580 (with acetoxy- and alkyl-capped polyethers) are conventional Copolymer surfactants. Blowing agent U-11 is $CCl_3F$. ARCOL® polyol 16–56 is a commercial product of ARCO Company, Inc., and has CAS Reg. No. 9082-00-2. Toluene diisocyanate (TDI) was a mixture of approximately 80% of the 2,4-isomer and 20% of the 2,6-isomer, and was used in excess. NIAX® catalyst A-200 and A-99 are tertiary amine catalysts and are commercially available from OSi Specialities, Inc.

The most convenient method for following the capping reaction is by observing the OH region in infra-red (IR) spectroscopy (ca. 3500 $cm^{-1}$). To avoid interference with water, the polyether was first blended with ≧0.2 volumes of toluene and then the toluene vacuum is stripped out to azeotrope any trace of water prior to reaction and/or sampling for IR analysis.

Ethyl vinyl ether as received contains 0.1% KOH as a preservative and this was taken into account in calculating acid catalyst levels (the reported wt% acid used is above that neutralized by base brought in by either the polyether or enol-ether). A-18 resin (Rohm and Haas) was reported to have 4.57 meq acid/gram.

A typical procedure used to cap the polyethers with 2,3-Dihydro-4H-Pyran (DHP) included charging a 4-necked flask (equipped with mechanical stirrer, thermometer, nitrogen inlet, and distillation head) with the polyether and then 10–50% equivalent excess of 2,3-dihydro-4H-pyran (DHP). If the material was highly viscous, an inert (non-hydroxyl-containing) solvent such as toluene was added. The catalyst was added (0.2wt% PTSA or $H_2SO_4$) and the contents kept below 45° C. (PTSA may require gentle heating to dissolve). After 1–2 hours, the reaction mixture was tested for completeness by IR. Base was added (preferably $Na_2CO_3$ or tertiary amines), the resulting crude product was vacuum stripped to remove any excess DHP, lights, or solvents (if used), filtered (if hazy), and treated with 500–2000 ppm of a tertiary amine to insure the pH was substantially above pH 7. None of the DHP-capped polyether exhibited any detectable dimer by GPC analysis. For example, following the above procedure, 698g of a dry allyl-alcohol started 40HA4000 polyether and 28g DHP were treated with 1.3g PTSA at 45° C. for 1 hour in a 1 L flask. IR analysis revealed no residual OH and 14.5 g $K_2CO_3$ was added and the resulting material stirred overnight. After filtering, 1.3 g tributylamine was added and the crude product was vacuum stripped (50° C. @ 5 mmHg for 2 hours).

A typical procedure for EVE capping included charging a 500mL 4-necked flask (equipped with stirrer, thermometer, pressure equalizing addition funnel with a nitrogen inlet, and distillation head) with about 220g dry polyether. If the polyether was highly viscous, inert (non-hydroxyl-containing) solvent such as toluene was used. The catalyst is added to the polyether (0.2wt% $H_2SO_4$ or 3mL of A-18 resin) cooled below 10° C. A 10–25% equivalent excess of EVE dispersed in an equal volume of inert material (e.g., toluene to help allow slow addition rate and avoid high local concentrations of EVE) was added over the coarse of an hour via the addition funnel being sure the pot temperature remained below 10° C. After 2 hours (@ <10° C.), the reaction mixture was tested for completeness (more EVE was added if needed). Base was added (preferably $Na_2CO_3$ or tertiary amines), the resulting crude product was vacuum stripped to remove any excess EVE and lights or solvents (if used), filtered, and treated with 500–2000 ppm tertiary amine to insure the pH was substantially above pH 7. For example, following the above procedure, 220g of an allyl alcohol 40HA1500 polyether was dried via the toluene azeotrope procedure. The polyether was cooled to 4°–7° C. and 0.12 g $H_2SO4$ was added. A pressure equalizing addition funnel was charged with 12.1g EVE (14% excess) and an equal volume of toluene. The EVE was slowly added over the course of an hour keeping the temperature below 10° C. A greenish tint developed as the last of the EVE was added. IR analysis revealed no residual OH and excess trimethylamine was bubbled in for 30 minutes (the color immediately faded to pale clear yellow) and the resulting material stirred overnight with 0.43 g tributylamine. The resulting material was vacuum stripped (110° C. @ 5 mmHg for 1 hr) to yield a rusty-red capped polyether. GPC analysis suggested that 9–10% of the polyether was in the form of a dimer.

A typical preparation of siloxane production proceeded as follows: A flask fitted with a mechanical stirrer, a reflux condenser, and a thermometer was charged under positive nitrogen pressure with the desired $M''D_xD'_yT_zM''$ fluid, blend of polyethers, and solvent (if used). Where indicated, buffer (e.g., tributylamine) was added, the mixture was stirred and heated to 80°–85° C., and an ethanol solution of hexachloroplatinic acid (25 ppm Pt) was added. An exotherm of 5°–15° C. ensued, after which the reaction was allowed to proceed for approximately 40 minutes. Any volatile solvents or by-products were removed under vacuum, and the resulting copolymer product was cooled-to room temperature, and optionally neutralized with sodium bicarbonate or tertiary amines (if acidic). Table 3 gives exact raw material charges for each copolymer.

TABLE 3

Representative Copolymer Preparations

| Ref. | BAMW | Polyether 1 | Wt | Polyether 2 | Wt | SiH Fluid | Wt | Wt Toluene |
|---|---|---|---|---|---|---|---|---|
| A | 2100 | 40HA4000MWt-Pyr | 16.2 | 40HA1500MWt-Pyr | 20.0 | $MD_{72}D'_{5.5}D$ | 13.8 | 21.4 |
| B | 2300 | 40HA4000MWt-Pyr | 20.2 | 40HA1500M-Wt-Pyr | 16.9 | $MD_{72}D'_{5.5}D$ | 12.9 | 21.4 |
| C | 1265 | 40HA4000MWt-Pyr | 44.7 | 100HA550-Pyr | 27.2 | $MD_{68}D'_{7.5}D$ | 28.1 | 42.9 |
| D | 1400 | 40HA4000MWt-Pyr | 49.8 | 100HA550-Pyr | 24.1 | $MD_{68}D'_{7.5}D$ | 26.1 | 42.9 |
| E | 750 | 75HA750MWt-Pyr | 67.2 | -NONE- | — | $MD_{42}D'_{7}D$ | 32.8 | 0 |
| F | 2100 | 40HA4000MWt-EVE | 31.2 | 40HA1500MWt-EVE | 41.0 | $MD_{72}D'_{5.5}D$ | 27.9 | 43 |
| G | 2300 | 40HA4000MWt-EVE | 39.4 | 40HA1500MWt-EVE | 34.6 | $MD_{72}D'_{5.5}D$ | 26.0 | 43 |

The surfactants were evaluated in the polyurethane foam formulation set forth in Table 4 below. The procedure for the evaluation was as follows: A 32 oz paper cup was charged with ARCOL® polyol 16–56 (250g), the surfactant to be evaluated, amine/water premix, and methylene chloride. A brass mixing baffle with four equally spaced 0.5 inch wide vertical baffles was inserted into the cup, and the mixture was stirred for 15 seconds at 2150 rpm using a drill press with a marine blade. After 20 seconds stannous octoate (0.575 g, 0.46 mL) was added to the reaction mixture. A timer was started and the mixture was stirred for 8 seconds before adding 80/20 TDI (173.6 g) with continuous stirring for an additional seven seconds. The stirrer was then stopped and the reaction mixture was dumped into a 5 gallon plastic bucket (5 gallon can liner). The cup was kept inverted over the bucket for a total of ten seconds. The maximum height of the foam at blowoff, the amount of top collapse after one minute, and the rise time were recorded by sonar detector. The foam was placed in an oven at 120° C. for about ten minutes, and then was allowed to cool to room temperature overnight. The foam was cut open using a band saw and samples were taken for evaluation. 4"×4"×½" pieces were cut from the center using a bread slicer. For each sample the cell size (commonly referred to as the foam "structure") was assessed (lower value is better) and breathability through the foam was determined using a Nopco breathability apparatus (adjusted back pressure to 0.5 inches of water and read air flow in standard cubic feet per minute). The Nopco device is described in the article by Jones and Fesman, J. Cellular Plastics, 1, 3–19 (1965). Generally speaking, coarse foam structures are undesirable and generally result in very low breathabilities. Extremely coarse, spongy or partially collapsed foams were often not examined for cell size or airflows.

TABLE 4

Flexible Polyurethane Foam Test Formulation

| Material | pphp (wt.) |
|---|---|
| ARCOL 200 Polyol 16-56 | 100 |
| Distilled water | 6.5 |
| NIAX ® Catalyst A-200 | 0.12 |
| Methylene chloride | 24 |
| Stannous octoate | 0.23 |
| TDI | 83 |
| Surfactant | varied[a] |

[a]Surfactant samples containing diluent were evaluated such that the contained copolymer was the same as other materials ("pphp" in Tables 5 and 6 refers to contained copolymer).

Table 5 indicates good reactivity and foam performance was observed compared to prior art surfactants L-618 (acetoxy-capped) and L-580 (alkyl-capped). The EVE capped Copolymers exhibited good foam performance at the use levels typical of the Asia/Pacific area (3–5 pphp or more) where these materials would have the greatest utility (the test formulation used is very stressed and even some commercial surfactants exhibit high structure values at low use levels). The EVE capped materials had flatter airflow performance (compared to L-580) demonstrating the advantage of the ~100% capping possible with this invention.

TABLE 5

Flexible Foam Testing of Surfactants made with Enol Ether Capped Polyethers

| Reference | Use Level (pphp) | Final Rise (cm) | Top Collapse (cm) | Airflow (NOPCO) | Struct. | IFD (25%) | Density (lb/ft$^3$) | Comment |
|---|---|---|---|---|---|---|---|---|
| F | 3 | 18.56 | 5.57 | 21.0 | 15 | 17.50 | 0.92 | Soft blow |
| F | 3 | 24.34 | 1.44 | 60.0 | 8 | 23.60 | 0.69 | Soft blow |
| G | 1 | 20.22 | 3.92 | 20.0 | 15 | 18.72 | 0.81 | Soft blow |
| G | 3 | 24.75 | 2.27 | 56.0 | 8 | 22.91 | 0.68 | Soft blow |
| L-580 | 1 | 25.36 | 1.25 | 149.0 | 8 | 21.60 | 0.67 | Soft blow |
| L-480 | 3 | 27.24 | 0.40 | 21.0 | 8 | 24.85 | 0.66 | Soft blow |
| A | 1 | 21.14 | 3.42 | 227 | 8 | 20.12 | 0.71 | Soft blow |
| A | 3 | 25.16 | 1.00 | 50 | 8 | 26.65 | 0.67 | Soft blow |
| B | 1 | 22.53 | 2.41 | 191 | 9 | 12.99 | 0.71 | Soft blow |
| B | 3 | 25.55 | 0.82 | 29 | 8 | 25.77 | 0.65 | Good blow |
| L-580 | 1 | 23.3 | 2.9 | 327 | 9 | 23 | 0.7 | Normal |
| L-580 | 3 | 28.0 | 0.2 | 13 | 8 | 23.5 | 0.6 | Normal |
| C | 1 | 22.48 | 1.84 | 102 | 12 | 21.13 | 0.73 | Soft blow |
| C | 3 | 25.99 | 1.03 | 60 | 9 | 23.51 | 0.66 | Soft blow |
| D | 1 | 24.13 | 2.26 | 98 | 12 | 22.57 | 0.73 | Soft blow |
| D | 3 | 25.99 | 0.83 | 32 | 9 | 25.38 | 0.68 | Soft blow |
| L-618 | 1 | 21.7 | 3.1 | 160 | 10 | 23.4 | 0.8 | Normal |
| L-618 | 3 | 25.2 | 1.6 | 84 | 9 | 22.9 | 0.7 | Normal |

To demonstrate the desired water/amine premix stability, 2,3-dihydropyran-capped copolymer (Copolymer B) and its methyl-capped analogue (Copolymer H) were each blended with the water/amine premix used to make polyurethane foam. Each blend was heated at 72° C. and tested over a period of time. The samples were cooled to ambient temperature, mixed well, then evaluated in conventional polyurethane foam in place of the surfactant and water/amine premix (surfactant delivered at approx. 1 pphp). The results, shown in Table 6 clearly show no loss of foam performance over a period of over 670 hours at above 70° C. (roughly equivalent to a year at ambient temperature).

TABLE 6

Foam Testing for Water/Amine Premix Stability

| | Rise (cm) | | AF (NOPCO) | | Structure | |
|---|---|---|---|---|---|---|
| Time (Hrs) | B | H | B | H | B | H |
| Initial | 38.77 | 40.35 | 49 | 88 | 5 | 4 |
| 24 | 39.31 | 41.14 | 50 | 57 | 5 | 4 |
| 144 | 39.93 | 42.4 | 35 | 72 | 6 | 5 |
| 240 | 38.09 | 40.3 | 51 | 63 | 4 | 4 |
| 600 | 37.84 | 40.43 | 36 | 64 | 4 | 4 |
| 672 | 37.55 | 39.78 | 51 | 57 | 5 | 4 |

We claim:

1. A method for producing polyurethane foam comprising mixing together a polyether polyol, an organic diisocyanate, at least one catalyst, a blowing agent, and a polyether-polysiloxane copolymer surfactant of the average formula:

$$M''D_xD''_yT_zM''$$

wherein:

M" represents $(CH_3)_3SiO_{1/2}$ or $R(CH_3)_2SiO_{1/2}$;

D represents $(CH_3)_2SiO_{2/2}$;

D" represents $(CH_3)(R)SiO_{2/2}$;

T represent $CH_3SiO_{3/2}$;

x is from about 20 to about 220;

y is from about 5 to about 34;

z is less than 4;

R is selected from the group consisting of alkyl, aryl and aralkyl groups of 1 to 18 carbons and polyether-containing substituents obtained from the following two groups (1) and (2):

(1) $B—O(C_2H_4O)_{a'}(C_3H_6O)_{b'}R''$ polyethers having average molecular masses above 3000 daltons wherein B is an alkyl bridging group of $C_2$ to $C_4$;

a' and b' are independently 0 or positive numbers, provided that the total molecular weight of the polyether is above 3000 daltons;

R" represents —H, an alkyl group of 1–18 carbon atoms, —C(O)R'", —C(O)OR'" or —C(O)NHR'" or X;

X is a group [produced by reacting a compound of the formula $M''D_xD''_YT_xM''$wherein R" is —OH, with an enol-ether capping moiety which is $R'''_2C{=}CR'''{-}O{-}R'''$ or cyclic $-(CR'''_2)_r-Z_s-(CR'''_2)_{r'}-CR'''{=}CR'''-O-$] *of the formula*;

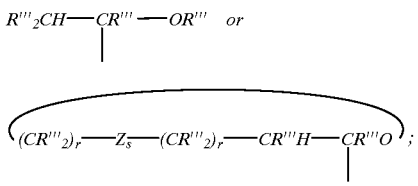

r is 1 to 5, s and r' are 0 through 1, and Z is O, S, or $SiR'''_2$;

R'" represents —H or a mono-functional alkyl, aralkyl or aryl group of up to 8 carbons; and (2) $B{-}O(C_2H_4O)_{a''}(C_3H_6O)_{b''}R''$ polyethers having average molecular masses in the range 300–3000 daltons wherein a" and b" are independently 0 or positive numbers, provided that the total molecular weight of the polyether is between 300 and 3000 daltons; and the B, R" and R'" moieties are as defined above; with the provisos that (i) an average of at least one R group per silicone backbone must be a polyether from group (1) or group (2); (ii) there may be more than one polyether from either group; (iii) up to 20% of the propylene oxide ($C_3H_6O$) moieties may be replaced with higher alkylene oxide moieties; and (iv) at least one pendant polyether must be capped with an X moiety.

2. A method according to claim 1 wherein at least one R substituent is selected from group (1).

3. A method according to claim 2 wherein there are at least two R substituents which are polyether-containing substituents and they differ from each other in molecular weight or in EO/PO ratio.

4. A method according to claim 2 wherein the sum of x+y exceeds 40.

5. A method according to claim 2 wherein the ratio x/y does not exceed 20.

6. A method according to claim 2 wherein the blend average molecular weight of all polyether substituents is between 1000 and 3000 daltons.

7. A method according to claim 2 wherein the blend average molecular weight of all polyether substituents is between 1100 and 2300 daltons.

8. A method according to claim 1 wherein at least one R substituent is selected from group (2).

9. A method according to claim 8 wherein the sum of x+y does not exceed 80.

10. A method according to claim 8 wherein the sum of x+y is between 30 and 50.

11. A method according to claim 8 wherein at least one R substituent is selected from polyethers of group (2) which contain less than 20% by weight propylene oxide residues and have a blend average molecular weight of 300 to 750 daltons.

12. Polyurethane foam made by mixing together a polyether polyol, an organic diisocyanate, at least one catalyst, a blowing agent, and a polyether-polysiloxane copolymer surfactant of the average formula: $M''D_xD''_YT_zM''$ wherein:

M" represents $(CH_3)_3SiO_{1/2}$ or $R(CH_3)_2SiO_{1/2}$;

D represents $(CH_3)_2SiO_{2/2}$;

D"represents $(CH_3)(R)SiO_{2/2}$;

T represent $CH_3SiO_{3/2}$;

x is from about 20 to about 220;

y is from about 5 to about 34;

z is less than 4;

R is selected from the group consisting of alkyl, aryl and aralkyl groups of 1 to 18 carbons and polyether-containing substituents obtained from the following two groups (1) and (2):

(1) $B{-}O(C_2H_4O)_{a'}(C_3H_6O)_{b'}R''$ polyethers having average molecular masses above 3000 daltons wherein B is an alkyl bridging group of $C_2$ to $C_4$;

a' and b' are independently 0 or positive numbers, provided that the total molecular weight of the polyether is above 3000 daltons;

R" represents —H, an alkyl group of 1–18 carbon atoms, —C (O) R '", —C(O)OR'" or —C(O) NHR'" or X;

X is a group [produced by reacting a compound of the formula $M''D_xD''_YT_xM''$ wherein R" is —OH, with an enol-ether capping moiety which is $R'''_2C{=}CR'''{-}O{-}R'''$ or cyclic $-(CR'''_2)_r-Z_s-(CR'''_2)_{r'}-CR'''{=}CR'''-O-$] *of the formula* ;

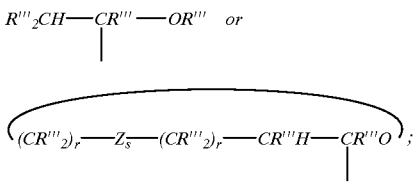

r is 1 to 5, s and r' are 0 through 1, and Z is O, S, or $SiR'''_2$;

R'" represents —H, or a mono-functional alkyl, aralkyl or aryl group of up to 8 carbons; and (2) $B{-}O(C_2H_4O)_{a'}(C_3H_6O)_{b''}R''$ polyethers having average molecular masses in the range 300–3000 daltons wherein a" and b" are independently 0 or positive numbers, provided that the total molecular weight of the polyether is between 300 and 3000 daltons; and the B, R" and R'" moieties are as defined above; with the provisos that (i) an average of at least one R group per silicone backbone must be a polyether from either group (1) or group (2); (ii) there may be more than one polyether from either group; (iii) up to 20% of the propylene oxide ($C_3H_6O$) moieties may be replaced with higher alkylene oxide moieties; and (iv) at least one pendant polyether must be capped with an X moiety.

13. Polyurethane foam according to claim 12 wherein at least one R substituent is selected from group (1).

14. Polyurethane foam according to claim 13 wherein there are at least two R substituents which are polyether-containing substituents and they differ from each other in molecular weight or in EO/PO ratio.

15. Polyurethane foam according to claim 13 wherein the sum of x+y exceeds 40.

16. Polyurethane foam according to claim 13 wherein the ratio x/y does not exceed 20.

17. Polyurethane foam according to claim 13 wherein the blend average molecular weight of all polyether substituents is between 1000 and 3000 daltons.

18. Polyurethane foam according to claim 13 wherein the blend average molecular weight of all polyether substituents is between 1100 and 2300 daltons.

19. Polyurethane foam according to claim 12 wherein at least one R substituent is selected from group (2).

20. Polyurethane foam according to claim 19 wherein the sum of x+y does not exceed 80.

21. Polyurethane foam according to claim 19 wherein the sum of x+y is between 30 and 50.

22. Polyurethane foam according to claim 19 wherein at least one R substituent is selected from polyethers of group (2) which contain less than 20% by weight propylene oxide residues and have a blend average molecular weight of 300 to 750 daltons.

* * * * *